(No Model.)

N. T. HALE.
THILL COUPLING.

No. 326,863.            Patented Sept. 22, 1885.

WITNESSES
Franklin G. Felgendrin
Henry F. Nash

INVENTOR
Nelson T. Hale
By Henry Winn
Attorney

UNITED STATES PATENT OFFICE.

NELSON T. HALE, OF CUMMINGTON, MASSACHUSETTS.

THILL-COUPLING.

SPECIFICATION forming part of Letters Patent No. 326,863, dated September 22, 1885.

Application filed September 29, 1882. (No model.)

*To all whom it may concern:*

Be it known that I, NELSON T. HALE, of Cummington, in the county of Hampshire and State of Massachusetts, have invented certain new and useful Improvements in Thill-Couplings, whereof the following is a specification, reference being had to the accompanying drawings.

The object of my invention is to produce a thill-coupling which shall lock the thill-iron firmly to the axle-clip without interfering with the free action of the thill, which shall be protected against the rattling of the thill-iron, which shall allow the thill to be instantly and easily attached to or detached from the clip, which shall have no part detached by the process and liable to be lost, and no part liable to detachment by accident, which shall be so constructed and arranged that the natural use of the thill shall tend to draw the locking parts more firmly into their locked position, and in which, if either of the parts usually liable to fail in thill-couplings shall break or be lost, the others will continue to perform the functions required of the whole mechanism.

Figure 1:
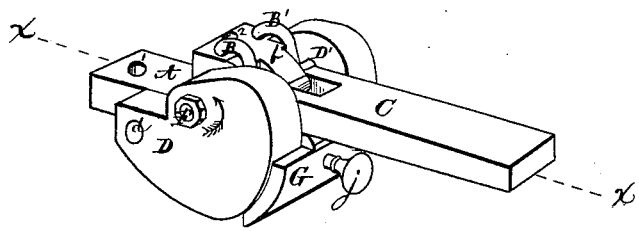
Figure 2:
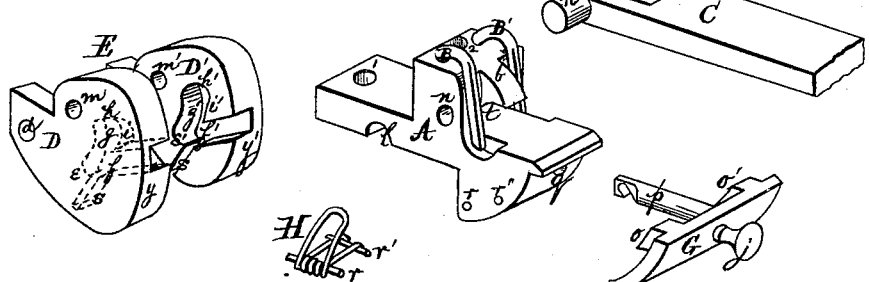
Figure 3:
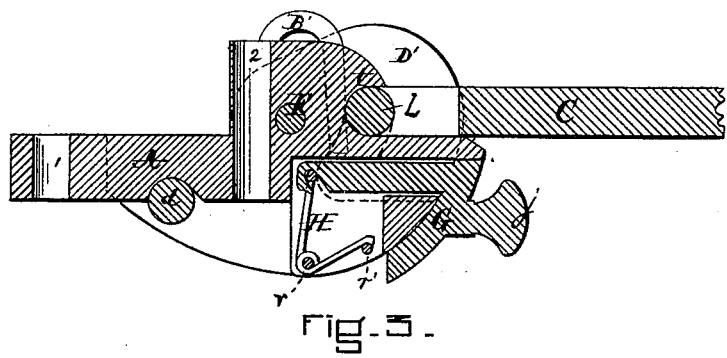

In the drawings, Figure 1 shows a view in elevation of my improved thill-coupling. Figs. 2 represent in elevation the principal parts of the device separately. Fig. 3 shows a vertical section of the same, taken through the lines $x\,x$ of Fig. 1.

A is the draw-iron, into which are drilled two holes, 1 and 2, for the attachment of the clip by any of the usual modes.

To the draw-iron are attached two anti-rattling springs, B B', which in use press against the axis L of the thill-iron C, and hold it to its bearings to prevent rattling. The thill-iron C, which may be attached to the thill or pole of a wagon by any of the usual methods, works in a bearing, $t$, of the draw-iron under its projection $b$, and has a slot, $c$, cut in it, to admit the projection and allow the free working of the thill-iron of the axial part L. The part $a$ works in the bearing $t$, and the parts $k\,k'$ in the bearings $h\,h'$.

D and D' are swinging side pieces, which are rigidly united by the bolt $d$, so that they act in unison, and with said bolt form an integral part, (designated as E.) In the two side pieces are cut two similarly-formed grooves, $e\,e'$, each of which is formed by two uniting grooves—namely, the groove $e$ (which is shown by the dotted lines in part E, Fig. 2) is composed of the grooves $f$ and $g$, and the groove $e'$ is composed of the grooves $f'$ and $g'$, in the upper ends of which grooves $g$ and $g'$ are formed the bearings $h\,h'$, in which work the ends $k\,k$ of the axial part L. The grooves $g\,g'$ are also inclined forward, as shown, relatively to the position of the axial pin F in the part E, (on which pin said part swings,) making thereby the inclinations $i\,i'$, against which, if the part E is by accident or otherwise partially turned in the direction shown by the arrow, Fig. 1, the thill-iron, when drawn forward as in use, impinges, and thereby tends to turn the part E into its locked position.

G is the key which fastens the various parts together, and is manipulated by the thumb-pull $j$. This key has two similarly-formed projections, $o\,o'$, which, with the body of said key, form the hooks which hook into the grooves $f\,f'$, fitted to receive them, and a projection, $p$, having on its inner end a hook, which projection, when the parts are in place, is in the hole $q$ of the draw-iron, and has on its inner end a hook taking hold of the spring H, which spring is fastened in a cavity of the draw-iron by the studs $r\,r'$. When the parts are in place, the draw-iron is between the side pieces, D D', the bolt $d$ lying in the groove $l$ of the draw-iron, and the axial pin F is passed through the holes $m\,m'$ of the side pieces and the bearing $n$ of the draw-iron, and is fastened in place by nuts, as shown, or otherwise. If nuts are used, they may be headed over to prevent unscrewing. The grooves $s\,s'$ are for the escape of dust and water.

The working of this coupling is as follows: The parts being together, as in Fig. 1, to detach the thill-iron the key is pulled out by the thumb-pull against the tension of spring H until the projections $o$ and $o'$ are drawn out of the grooves $f$ and $f'$, when the part E is rotated on its axial pin F in the direction indicated by the arrow, Fig. 1, until the grooves $e\,e'$ are above the plane surface of the draw-iron under projection $b$, when the ends $k\,k'$ of the axial part L, being held down by said projection, will have passed to the grooves $f\,f'$, through which they may readily be withdrawn. The key G, being released, will be held by the spring H fast to the surfaces $yy'$ of the part E. Similarly the thill-iron may be attached when the parts are in the position described for detachment by returning the ends $k\,k'$ through the grooves $ff'$ to the grooves $g\,g'$, and rotating the part E in the direction the reverse from that indicated by the arrow until the ends $k\,k'$ reach their bearings, when the projections $o\,o'$ will be drawn into place in the grooves $ff'$ by the spring H, and the key will lock the parts firmly together.

The grooves $g\,g'$ are so cut away that no backward pressure of the thill-iron can in any way be communicated to the part E, but it brings up first against the springs B and B', and after they are overcome then against the draw-iron and its projection $b$. The only force of the thill-iron which affects the part E is the drawing force, and that, unless the part E is turned entirely up to its position described for detachment, or back until the parts $k\,k'$ are in their bearings $h\,h'$, will only bring the ends $k\,k'$ against the inclinations $i\,i'$, and drive, by rotation, the part E into its locking position, and the key, if out, will be drawn into place by the spring H. The draft, therefore, tends to connect the parts, and no force exerted by the thill-iron tends to disconnection unless the parts are adjusted therefor.

The key G is held in place by its gravity, being hooked into the grooves $f\,f'$, and also by the direct draft of the spring H; but if the key should be disconnected and lost no inconvenience would be likely to arise, for the chief part of the weight of the part E is in front of the pin F. Its gravity would therefore tend to prevent its rotation to the unlocking position. The springs B B', pressing the ends $k\,k'$ against the inclinations $i\,i'$, likewise resist the unlocking rotation of the part E, and if the key were withdrawn, but not detached, the friction of the projections $o\,o'$, urged by the spring H upon the faces $yy'$, would further resist the unlocking rotation of the part E. On the other hand, if the axial pin F should come out or break, the coupling would continue to operate, because the key G, by its projection $p$ entering the draw-iron and its projections $o\,o'$ entering the part E, would lock those parts firmly together, and the draft would be borne jointly by the key and the bolt $d$ in the groove $l$. In short, there is no tendency in the operation of the draw-iron to detachment of parts, but the contrary; but if either of the parts usually liable to fail—namely, the spring H, pin F, or key G—should be detached, the mechanism would continue to operate and no accident arise.

The grooves may be any openings in the side pieces guiding the axial part L to its bearings therein, and rotated out of position to allow its detachment, preferably having the inclines $i\,i'$ for the purposes described.

The bearing $t$ of the thill-iron in the draw-iron may be in the clip itself or any part attached thereto, or may be any projection thereof, limiting the backward motion of the thill-iron or its motion in the direction in which its pressure against the part E would tend to rotate that part in its unlocking direction. The thill-iron fills the space between the side pieces, D D', and thus each of them limits its sidewise motion and prevents it from passing out of its bearing in the opposite side piece and in the draw-iron. The device would therefore be operative if either one of the side pieces had no grooves or bearing for the thill-iron, or was a simple projection of the draw-iron in position to limit the sidewise motion of the thill-iron, and the corresponding projection, $k$ or $k'$, operating in it were cut off, the thill-iron then operating in the remaining bearing; or either of the side pieces—D, for instance—might be dispensed with by leaving in its place a fixed projection of the drive-iron having a complete bearing, $k$, and located in position to resist sidewise motion of the thill-iron, in which case the groove $f'$, including the part of the groove $g'$ at the junction with the groove $f'$, must be cut entirely through the side of the part D' large enough to allow the thill-iron to pass through it sidewise.

What I claim as my invention, and for which I pray Letters Patent, is—

1. In a thill-coupling, a thill-iron having a bearing for its axial part, composed partly of a bearing in a projection of the axle-clip and partly of a bearing in a side piece, which has a partial rotation on a pivot located in a part rigidly attached to the axle-clip, and having a stop located in position to prevent the sidewise motion of said axial part out of either of said bearings, which side piece has a groove opening into the bearing in it, which groove and bearings are constructed and arranged relatively to each other and to said axial part in said bearings, in the manner described, by which the bearing in the projection of the axle-clip holds said axial part from rotation with the side piece in its rotation required to rotate the bearing in such side piece away from the portion of the axial part in it, passing said groove over said part until another groove or opening in said side piece reaches it, brought by said rotation into position to allow the withdrawal through it of said axial part from the side piece, in which position an opening in the bearing in the projection of the axle-clip allows the simultaneous withdrawal of said axial part from that bearing.

2. In a thill-coupling, a thill-iron having a bearing for its axial part, composed partly of a bearing in a side piece which has a partial rotation on a pivot in a draw-iron rigidly attached to the axle-clip, and partly of a bearing in said draw-iron, and having a stop located in position to prevent sidewise motion of said axial part out of either of said bearings, which bearing in the side piece has a groove opening into it, which is rotated over said axial part in a given direction of the rotation of the side piece to separate said bearing from said part, and which bearing in the draw-iron is constructed and arranged in the manner described relatively to said side piece in its rotation and to said axial part when in the two bearings, to prevent said part from impinging against its bearing in the side piece in a direction tending to rotate said side piece in said given direction.

3. In a thill-coupling, a thill-iron having a bearing for its axial part, composed partly of a bearing in a side piece having a partial rotation on a pivot in a draw-iron rigidly attached to the axle-clip, and partly of a bearing in said draw-iron, and having a stop located in position to prevent sidewise motion of said axial part out of either of said bearings, which bearing in the side piece has a groove opening into it, which is rotated over said axial part by rotation of the side piece in a given direction in the process of withdrawing said axial part from said side piece, as described, which groove has an inclined face, arranged as described, to present to said axial part, in various positions of such rotation, its inclined surface in the position in which the impact of said axial part on said surface in the forward motion of the thill-iron required for draft of the vehicle to which it is attached tends to rotate said side piece in a direction the reverse of that of said rotation, the bearing in the draw-iron being constructed as described, to hold said axial part from impinging on said inclined face in any direction except that required to produce such reverse rotation.

4. The anti-rattling spring B, bearing against the axial part of the thill-iron, when said part is in its bearing in the draw-iron, in a direction tending to force the portion of said axial part operating in its bearing in the side piece D when therein against said bearing, and to create thereby a friction resisting the rotation of said side piece on its pivot in the draw-iron, and tending, also, when said side piece is rotated in the direction required to pass said bearing away from said portion of the axial part, and the inclined face *i* is brought by such rotation into position to receive its impact, to drive said portion of the axial part against said face in the direction required to exert a force tending to counteract such rotation, all said parts being arranged and constructed as described.

5. In a thill coupling, a thill-iron having a bearing for its axial part, formed partly of a bearing in a draw-iron rigidly attached to the axle-clip, and partly of another bearing in a side piece having a partial rotation on a pivot in a part rigidly attached to the axle-clip, a stop being located in position to prevent the sidewise motion of said axial part out of either of said bearings, which axial part is withdrawn from the bearing in the side piece by the rotation of said side piece in a given direction, passing a groove therein over the portion of the axial part operating in the side piece, the axial part being held from rotation by its bearing in the draw-iron till an opening in the side piece is rotated into position to allow such withdrawal, an opening in the bearing of the draw-iron permitting said withdrawal and a withdrawal of said axial part from it, all said parts being combined with a key adjusted to enter an opening in the draw-iron and an opening in the side piece when both said parts are in the position relatively to each required for the operation of the axial part in both said bearings, thereby blocking, as described, said rotation, which key is held in place by a spring or its equivalent.

6. The combination, in a thill-coupling, first, of the thill-iron C, having an axial part, L, including the portions $a$ and $k$; second, of the draw-iron A, having a bearing, $t$, for said portion $a$; third, of a side piece, D, pivoted to the draw-iron, having a partial rotation on its pivot, having a bearing, $h$, for said portion. $k$, and having the groove $g$, opening into said bearing, and the groove or opening $f$, entering said groove $g$; fourth, a side piece, D', located in position to prevent the sidewise motion of said axial part from either of its said bearings, as described, and attached to the draw-iron; fifth, of a key held in place in the coupling by a spring or its equivalent, and having projections arranged relatively to an opening in the draw-iron and an opening in the side piece, D, in the position of the rotation of said side piece described, in which said axial part L is in said bearings, to enter said openings and block thereby said side piece, D, from rotation, all said parts being arranged and operating as described.

7. In a thill-coupling, the draw-iron A, the part E, having a partial rotation, as described, on the axial pin F, located in a bearing in the draw-iron A, and the key G, held in place by the spring H, all said parts being constructed, and arranged, and operating as described.

8. The part E, having a partial rotation in one direction on the axial pin F in the draw-iron A, for the purpose of rotating the bearings $h\ h'$, as described, into position for the operation therein of the axial parts $k\ k'$ of the thill-iron C, and weighted, as described, in the portion of it moving downward in its said rotation in said direction.

NELSON T. HALE.

In presence of—
D. E. LYMAN,
CHAS. I. HOLMES.